July 28, 1931.  E. R. WOLFERT  1,816,418
VOLTAGE COMPENSATING MEANS
Filed May 1, 1930
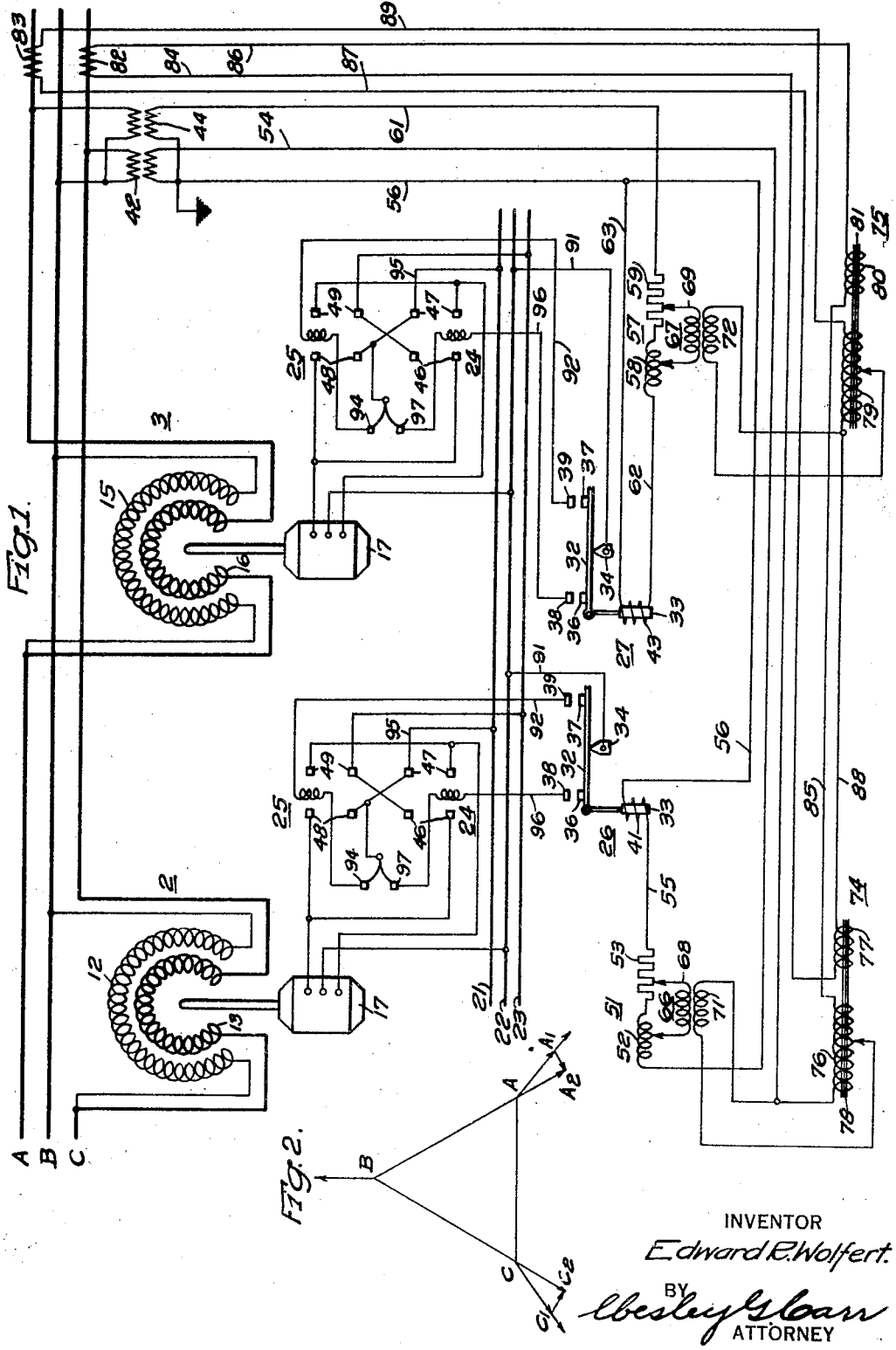
INVENTOR
Edward R. Wolfert.
BY
Wesley G. Carr
ATTORNEY Patented July 28, 1931

1,816,418

UNITED STATES PATENT OFFICE

EDWARD R. WOLFERT, OF WILKINSBURG, PENNSYLVANIA, ASSIGNOR TO WESTING-HOUSE ELECTRIC & MANUFACTURING COMPANY, A CORPORATION OF PENNSYLVANIA

VOLTAGE COMPENSATING MEANS

Application filed May 1, 1930. Serial No. 448,883.

My invention relates to voltage responsive devices and it has particular relation to means for compensating such devices connected to a polyphase electric circuit.

It is frequently desirable to energize two electro-responsive devices, such as volt-meters or regulators, in accordance with the voltage across two different phases of a three-phase electric circuit at a point remote from the point of connection of such devices to the circuit. It is then necessary to compensate the energization of each device in accordance with the voltage drop in the phase of the circuit to which the device is connected that is caused by the resistance and the reactance of the circuit.

This compensation may be secured by connecting a compensator, consisting of a resistor and a reactor, into the energizing circuit of each electro-responsive device and energizing each compensator with current that bears a predetermined relation to the current flowing in the associated phase of the electric circuit. The compensators are so connected in the circuit and so adjusted that the ohmic and reactive voltage drops across each compensator are proportional to the ohmic and reactive voltage drops in the associated phase of the circuit.

Each electro-responsive device is so energized as to be responsive to a voltage that is proportional to the vector sum of the voltage across the associated phase of the circuit, the ohmic voltage drop in the associated phase of the circuit, and the reactive voltage drop in the associated phase of the circuit. Since the voltages that are proportional to the ohmic and reactive voltage drops in their associated phases will increase as the load on the circuit increases and decrease with a reduction in the load, they may be utilized to automatically compensate for the voltage drop in the associated phases of the circuit for all loads.

In order that the compensators may be energized in accordance with the above indicated values and reflect the true voltage drops in the phases of the circuit with which they are respectively associated, the current that flows through each compensator must have the same phase relation with the voltage impressed on its associated electro-responsive means as the current in the associated phase of the main circuit bears to the voltage of that phase of the circuit.

In a three-phase three-conductor electric circuit, the current flowing in any one conductor at unity power factor is displaced thirty electrical degrees from the voltage across that conductor and one of the other conductors. It will be apparent therefore, that if each electro-responsive means is energized with voltage that is proportional to the voltage of one phase and its associated compensator is energized with current that is proportional to the current flowing in one of the conductors of the same phase, the current energizing the compensator will not be in phase with the voltage impressed upon the associated electro-responsive means. It is, therefore, necessary to so shift the phase position of the current flowing through each compensator from the current flowing in a conductor of its associated phase of the circuit that it will have the proper phase relation with the voltage impressed upon its associated electro-responsive means.

It has heretofore been necessary to employ three inter-connected current transformers to secure the necessary shift in the phase position of the current that energizes each compensator from the current flowing in one conductor of the associated phase, one transformer being connected in each conductor of the three-phase circuit.

An object of my invention is to provide means for so shifting the phase positions of the currents flowing through the compensators that they shall have the same phase relation with the voltages impressed on their associated electro-responsive means as the phase relation between the current and voltage of the associated phases of the circuit.

Another object of my invention is to secure the phase shift of the currents flowing through the compensator by employing only two current transformers in the three-phase circuit.

My invention is illustrated and described as applied to compensators employed with relays that control the operation of two induction regulators connected in two phases of a three-phase electric circuit, but it will be obvious that it is not limited to this application.

My invention will be better understood by referring to the following description when read in conjunction with the accompanying drawings, in which:

Figure 1 is a diagrammatic view of apparatus and circuits employed in one embodiment of my invention as applied to two induction regulators that are connected in a three-phase electric circuit, and Fig. 2 is a vector diagram showing the phase relation between the voltages of the different phases and the currents flowing through each conductor of the three-phase, three-conductor, electric circuit at unity power factor and the phase relations of the magnetomotive forces produced by the phase shifting transformer windings.

Referring to the drawings, two induction regulators 2 and 3 are provided for regulating the voltages of two phases BC and AB of a three-phase electric circuit comprising conductors A, B and C. The regulator 2 regulates the voltage of phase BC and comprises a primary winding 12 that is connected across the phase BC and a secondary winding 13 that is connected in series-circuit relation with conductor C. The regulator 3 is similar to the regulator 2 and comprises a primary winding 15 that is connected across phase AB and a secondary winding 16 that is connected in series-circuit relation with the conductor A.

Motors 17, which are illustrated as three-phase alternating-current motors, are provided for changing the relative positions of the primary and secondary windings of the regulators 2 and 3. The motors 17 are energized from supply conductors 21, 22 and 23 in accordance with the operation of circuit-controlling relays 24 and 25 that are selectively energized by primary relays or contact-making voltmeters that are actuated in accordance with the voltage of the phase of the circuit to which the associated regulator is connected. Primary relays 26 and 27 are provided for controlling the operation of the motors associated with the regulators 2 and 3, respectively.

The relays 26 and 27 are similar each comprising a lever 32 supported by a pivot 34 and movably actuated by an electro-magnet 33. The lever 32 carries movable contact members 36 and 37 which cooperate, respectively, with stationary contact members 38 and 39 to complete circuits which energize the one or the other of the relays 24 and 25. The electro-magnet 33 of the relay 26 comprises an operating winding 41 that is connected to a potential transformer 42, that is responsive to the voltage across the phase BC at some convenient point on the load side of the regulator 2. The electro-magnet 33 of the relay 27 comprises an operating winding 43 that is connected to a potential transformer 44, that is responsive to the voltage across the phase A B at some predetermined point on the load side of the regulator 3.

Engagement of the contact members 36 and 38 or 37 and 39 causes an energizing circuit to be completed through the operating winding of one of the relays 24 and 25, thus actuating it to a circuit closing position. The relay 24, when operated, closes a circuit through the cooperating pairs of contact members 46 and 47, causing the motor 17 to operate in one direction. The relay 25, when operated, closes a circuit through the cooperating pairs of contact members 48 and 49, causing the motor 17 to be operated in the opposite direction.

A compensating device 51 comprising a reactor 52 and a resistor 53 is connected between the potential transformer 42 and the operating winding 41 to provide for introducing into the control circuit of the relay 26, a voltage that will compensate the action of the relay for the voltage drop in the phase BC of the circuit. The circuit of the operating winding 41 may be traced from one terminal of the secondary winding of the potential transformer 42, through conductor 54, the reactor 52, the resistor 53, conductor 55, winding 41, and conductor 56, to the other terminal of the secondary winding of the potential transformer 42.

A similar compensating device 57 comprising a reactor 58 and a resistor 59 is connected between the potential transformer 44 and the winding 43 of the relay 27. The circuit of the operating winding 43 may be traced from the secondary winding of the potential transformer 44 through conductor 61, the resistor 59, the reactor 58, conductor 62, winding 43, conductor 63, and conductor 56 to the secondary winding of the potential transformer 44.

Transformers 66 and 67 are provided having secondary windings 68 and 69, respectively, that are connected between points on the resistor and the reactor of the compensating devices 51 and 57, respectively. The transformers 66 and 67 are also provided with primary windings 71 and 72, that are energized in accordance with the current flowing in the conductors C and A, respectively, of the three-phase circuit.

To the end that the current flowing through the resistor and the reactor of each compensator may have the correct phase relation to the voltage impressed on the operating windings of their associated contact-making voltmeters, phase-shifting transformers 75 and 74 are provided for energizing the primary windings 71 and 72, respectively of the transformers 66 and 67. The transformer 74 comprises a main winding 76 and an auxiliary winding 77 mounted on an iron core 78. The transformer 75 is of similar construction comprising a main winding 79 and an auxiliary winding 80 mounted on an iron core 81.

The main winding 76 of the transformer 74 and the auxiliary winding 80 of the transformer 75 are connected in series-circuit relation to the secondary winding of a current transformer 82 that is associated with, and responsive to the current flowing in the conductor C of the circuit. This circuit may be traced from the secondary winding of the current transformer 82 through conductor 84, winding 76, conductor 85, winding 80 and conductor 86 to the secondary winding of the current transformer 82.

In a similar manner, the main winding 79 on the transformer 75 and the auxiliary winding 77 on the transformer 74 are connected to a current transformer 83 that is responsive to the current flowing in the conductor A. The circuit for energizing the windings 77 and 79 may be traced from the secondary winding of the current transformer 83, through conductor 87, winding 77, conductor 88, winding 79 and conductor 89 to the secondary winding of the current transformer 83.

The magnetomotive force produced by the current flowing in the winding 76 of the transformer 74 is in phase with the current flowing in the secondary winding of the current transformer 82 and is proportional to the ampere turns of the winding 76. The magnetomotive force produced by the winding 77 is in phase with the current flowing in the secondary winding of the current transformer 83 and is proportional to the ampere turns of the winding 77. When the circuit is operating at unity power factor, these magnetomotive forces may be represented by the vectors C—C1 and C—C2, respectively, in Fig. 2.

The relation and the ratio of turns of the two windings 76 and 77 are such that a resultant magnetomotive force is produced which is in phase with the voltage BC at unity power factor and may be represented by the vector C—C2. The resultant magnetomotive force produces a flux that generates sufficient electromotive force in the winding 76 to send current through the primary winding 71 of the transformer 66 and energizes its secondary winding 68 with current that is in phase with the voltage impressed on the winding 41 of the contact-making voltmeter 26.

At any other power factor, the current flowing through the secondary winding 68 of the transformer 66 will have the same phase relation to the voltage impressed upon the winding 41 as the phase relation between the voltage across the phase BC of the circuit and the current flowing in the conductor C.

The tap connection on the winding 76 is so selected that current of the proper magnitude will flow through the reactor 52 and the resistor 53.

In a similar manner, the transformer 75 delivers a current for energizing the reactor 58 and the resistor 59 of the compensator 57, that it is in phase with the voltage applied to the winding 43 of the relay 27 when the circuit is operating at unity power factor. The vector relation of the magnetomotive forces produced by the winding 79 and 80 of the transformer 75 at unity power factor may be observed from Fig. 2.

The operation of my system is as follows:

The connections of the secondary windings 68 and 69 of the transformers 66 and 67, respectively, to their associated resistor and reactor are such that the voltage drop across each compensator bears a predetermined ratio to the voltage drop in the associated phases of the circuit for a predetermined load thereon. At these settings the compensators 51 and 57 will introduce voltage components into the circuits of the operating windings 41 and 43, respectively, that will increase with an increase in load and decrease with a decrease in load on their respective phases of the circuit, becoming zero at no load.

When the voltages across the phases B C and A B are at the desired values and there is no load on the circuit, the current transformers 82 and 83 are unenergized and the full voltage of the transformers 42 and 44 are impressed on the windings 41 of the relay 26 and the winding 43 of the relay 27, respectively. At these voltages, the lever arms 32 of the relays 26 and 27 are in balanced positions.

When there is load on the circuit and current flows therein, the transformers 74 and 75 are energized, thereby energizing the compensators 51 and 57 with currents that are in phase with the voltages applied to their associated contact-making volt-meters. The voltage drops across the reactor 52 and the resistor 53 of the compensator 51 are subtracted vectorally from the voltage of the potential transformer 42, thus decreasing the energization of the winding 41, causing the electro-magnet 33 to move downwardly and actuating the lever 32 to effect engagement of the contact members 37 and 39 thereby completing a circuit through the operating winding of the relay 25. This circuit extends from a supply conductor 22 through conductor 91, lever 32, contact members 37 and 39, conductor 92, the operating winding of the relay 25, limit switch 94, conductor 95 to the supply conductor 21.

The relay 25 now operates and effects engagement of the cooperating pairs of contact members 48 and 49, thus completing a circuit to the motor 17 and causing it to operate the regulator 2 in one direction. The operation of the regulator changes the position of the winding 13 relatively to winding 12 to increase the voltage across phase B C until the difference in the voltage between the secondary of the potential transformer 42 and the voltage drop across the compensator 51 is the same as before and the lever arm 32 assumes a neutral position.

Under these conditions, the voltage across the potential transformer 42 will be higher than before, but at the center of distribution, the voltage across the phase B C will be substantially unaffected.

In a similar manner, the voltage drop across the compensator 57 decreases the energization of the electro-magnet 33 of the relay 27, thereby effecting operation of the regulator 3 to maintain the voltage across the phase A B substantially unaffected at the center of distribution.

When the load on the circuit decreases, the voltage drop across each compensator will decrease and the voltages impressed upon the windings 41 and 43 of the relays 26 and 27, respectively, will be more than sufficient to maintain the lever arms 32 in balanced positions causing the electro-magnets 33 to move upwardly, actuating the lever arms 32 to effect engagement of the contact members 36 and 38, thereby completing circuits through the operating windings of the relays 24 and actuating them to circuit closing positions. Each of these circuits extends from supply conductor 22, through conductor 91, contact members 36 and 38, conductor 96, the operating winding of the relay 24, limit switch 97, and conductor 95 to the supply conductor 21.

This operation of the relays 24 will effect engagement of the cooperating pairs of contact members 46 and 47, thus completing a circuit through the motor 17 and causing it to operate the regulators in such directions to decrease the voltage of the circuit until the lever arms are again in balanced positions.

Since many modifications may be made in the apparatus and circuits illustrated without departing from the spirit of my invention, I do not wish to be limited otherwise than by the scope of the appended claims.

I claim as my invention:

1. In combination, a main three-phase electric circuit, a plurality of electro-responsive means, auxiliary circuits for connecting each electro-responsive means to be energized in accordance with the voltage of one of two different phases of the main circuit, compensating means for introducing into each auxiliary circuit a voltage that is proportional to the voltage drop in the associated phase of the main circuit, comprising a resistor and a reactor connected in series-circuit relation in each auxiliary circuit, two current transformers, each transformer being energized in accordance with the current flowing in one of the conductors of the two phases of the main circuit, and means energized from said current transformers for energizing the compensators and for so altering the phase relation of the energizing currents of each compensator with respect to the currents in the main circuit that they shall have the same phase relation with the voltages impressed on the auxiliary circuits as the phase relation between the current and the voltage of the associated phases of the main circuit.

2. In combination, a main three phase electric circuit, two electro-responsive means energized respectively in accordance with the voltage of two different phases of said circuit, a compensating device connected in circuit with each electro-responsive means to compensate for the voltage drop in the respective phases of the main circuit, two current transformers, each current transformer being energized in accordance with the current flowing in a different one of the conductors of the two phases of the main circuit, a phase shifting transformer for energizing each compensator and comprising a main and an auxiliary winding, the main winding of each phase shifting transformer being connected to be energized from the current transformer of the associated phase, and the auxiliary winding being connected to be energized from the current transformer associated with the other phase.

3. In combination, a three-phase electric circuit voltage-regulating means connected in two phases of said circuit, electro-responsive means energized in accordance with the voltage of the respective phases of the circuit for controlling the operation of the associated regulating means, compensating means connected in circuit with each electro-responsive means for modifying the action of said electro-responsive means, two current transformers, each transformer being energized in accordance with the current flowing in a conductor of the respective phases of the three-phase circuit and connected to energize the associated compensating means, and means connected between the current transformers and the compensators for so shifting the phase position of the energizing current of each compensator that it will have a phase relation with the voltage impressed on the associated electro-responsive means corresponding to the phase relation between the current and voltage in the main circuit.

4. In combination, a main three-phase electric circuit, a voltage regulating means connected in two phases of said circuit, two voltage-responsive devices connected to be energized in accordance with the voltage of the two phases to control the operation of the associated regulator means, means for modifying the action of each voltage-responsive device to compensate for the voltage drop in the associated phases of the main circuit, comprising a compensator connected in the circuit of each voltage-responsive device, two current transformers, each transformer being energized in accordance with the current flowing in a conductor of the associated phases of the main circuit, a phase-shifting transformer associated with each compensator and comprising two windings mounted on an iron core, the two windings being energized from different current transformers, said phase-shifting transformers energizing their associated compensators.

5. In combination, a main three-phase electric circuit, voltage regulating means connected in two phases of said circuit, two voltage-responsive devices connected to be energized in accordance with the voltage of the two phases to control the operation of the associated regulator means, a compensating device for modifying the action of each voltage responsive means comprising a winding, two current transformers, said transformers being connected to be energized in accordance with the current flowing in one conductor of the phases of the main circuit that have regulating means connected therein, an auxiliary transformer associated with each compensator and comprising two inductively related windings, a winding of each auxiliary transformer being connected in series-circuit relation with a winding of the other auxiliary transformer and energized from a current transformer, each auxiliary transformer energizing its associated compensator to effect the operation of the voltage responsive devices to compensate for the voltage drop in the associated phase of the main circuit.

6. In combination, a main three-phase electric circuit, a voltage regulating means connected in two phases of said circuit, two voltage-responsive devices connected to be energized in accordance with the voltages of the two phases to control the operation of the associated regulator means, means for modifying the action of each voltage-responsive device to compensate for the voltage drop in the associated phase of the main circuit comprising a compensator connected in the circuit of each voltage-responsive device, two current transformers, each transformer being energized in accordance with the current flowing in one of the conductors of the two phases of the main circuit and connected to energize its associated compensator, means for so shifting the energizing currents of each compensator that they shall be in phase with the voltage impressed upon their associated voltage-responsive means at unity power factor comprising a phase-shifting transformer having a main winding connected in circuit with each current transformer and its associated compensator, each phase-shifting transformer having an auxiliary winding comprising a smaller number of turns than the main winding and mounted on the same core as the main winding and energized from the current transformer connected in the other of the two phases.

7. In combination, a three-phase electric circuit, a voltage-regulating means connected in two of the phases of said circuit, a contact-making voltmeter associated with each regulating means for controlling the operating thereof, means for energizing the windings of said voltmeters in accordance with the voltages of their associated phases of the main circuit, a line drop compensator connected in each voltmeter circuit and means for energizing each compensating device with current that is proportional to the current flowing in the associated phases of the main circuit comprising two current transformers energized in accordance with the current flowing in one conductor of the respective phases of the circuit, and a phase shifting transformer associated with each compensator comprising a main winding and an auxiliary winding, the main winding of each phase shifting transformer being energized from the current transformer connected to the associated phase of the circuit and the auxiliary winding being energized from the other current transformer, the main winding of each phase shifting transformer being connected to energize the associated compensating device.

In testimony whereof, I have hereunto subscribed my name this 29th day of April 1930.

EDWARD R. WOLFERT.